3,373,187
METHOD OF PREPARING ASPIRIN
Robert T. Edmunds, Norwich, N.Y., assignor to The Norwich Pharmacal Company, a corporation of New York
No Drawing. Filed June 12, 1964, Ser. No. 374,812
3 Claims. (Cl. 260—480)

ABSTRACT OF THE DISCLOSURE

An improved method for the manufacture of aspirin utilizing a metallic salt catalyst.

This invention relates to an improved method of preparing aspirin (acetyl salicylic acid).

For many years the method customarily employed to prepare aspirin of a degree of purity that is acceptable for pharmaceutical purposes, and in a form that lends itself to the ready tableting of the aspirin, involved a multi-step method which is both cumbersome and expensive. In that method, salicylic acid and acetic anhydride were reacted at elevated temperature and the product of the reaction was crystallized through controlled cooling in such a manner that the largest possible amount of the end product recovered thereby would be in the desired crystalline form most readily adapted to tableting. The end product was then filtered out, washed and dried but it was frequently necessary to resort to recrystallization to obtain the desired crystalline form of end product and to free it from impurities. The filtrate which was produced in this process was distilled to obtain additional quantities of the end product and also to recover solvents and unreacted reagents for recycling.

I have discovered that it is possible to prepare aspirin through a vastly simplified method which results in a very substantial reduction in the cost thereof, and it is a particular feature of my invention that the aspirin produced thereby is substantially pure (i.e., U.S.P.).

My method is based on the discovery that crystalline U.S.P. grade aspirin can be produced by reacting a mixture of salicylic acid and acetic anhydride (in slight excess) in the presence of a catalyst comprising a metallic salt. Acetic anhydride, salicylic acid, catalyst and preferably a diluent such as acetic acid are mixed together and the reaction mixture evaporated from which crystalline U.S.P. aspirin is directly obtained. This method eliminates filtration and washing necessitated by impurities and by-products.

A particularly surprising feature of my method is that the inclusion of a catalyst produces aspirin of over 99.5% purity at lower temperatures and shorter reaction times. In addition to the high purity of aspirin, near theoretical yields of aspirin and by-product acetic acid are obtained by my method. These high yields are primarily due to the fact that there is no opportunity for the formation of by-product anhydrides and for loss of materials through precipitation, filtration, washing and reworking of mother liquors.

Aspirin is prepared in accordance with my invention by mixing salicylic acid with a slight molar excess of acetic anhydride in a closed vessel and raising the temperature to about 65° C. A catalyst, preferably $Mg(OH)_2$, is added and the contents agitated. An inert diluent such as acetic acid may be used advantageously. The reaction mixture is agitated under a vacuum of about 100 mm. Hg absolute. As the reaction proceeds the mixture is distilled to dryness at a reduced vacuum. The vessel is cooled and the finished crystals are directly recovered in yields upwards of 95% of theoretical. The aspirin is uniform in character, of U.S.P. quality, and readily tableted.

While $Mg(OH)_2$ is the preferred catalyst, other compounds such as the salts of nickel, calcium, cobalt, etc, may be employed. Typical salts which exhibit marked effect on the reaction are nickel hydroxide, calcium nitrate, cobalt nitrate and magnesium acetate. The particular amount employed varies, depending upon the catalyst. A range of 25 p.p.m. to 500 p.p.m. has proven very effective.

While any inert, non-toxic, organic diluent distillable under the above conditions may be used advantageously in the above method, acetic acid is particularly desirable since this permits the recovery of both the diluent and by-product acetic acid in a single step, in a relatively pure form suitable for recycling as the diluent for subsequent reactions. The particular diluent does not constitute an important element of the invention and is deemed a mere matter of choice. Other suitable diluents such as benzene, toluene, or xylene may be employed advantageously.

In the practice of my invention, the method which I currently prefer consists in mixing acetic anhydride and salicylic acid in a proportion such that the anhydride is present in about 2–30% molar excess in a reaction vessel equipped with an agitator. Acetic acid is added as an inert diluent. The reaction mixture is then heated by external means, such as a jacket, to the desired temperature of about 65° C. to about 85° C. with agitation. Although agitation is not essential, it is helpful in expediting the reaction. The catalyst is added and the initial pressure of about 100–150 mm. Hg absolute is lowered as the reaction proceeds. Distillation at about 20–50 mm. of Hg absolute removes the liquid, drying the crystal. After cooling, the finished crystals are removed from the vessel. The distilled materials are employed in recycle and the excess acetic acid produced in the reaction sold.

In order that my invention may be readily available to and understood by those skilled in the art, the following specific examples thereof are given:

Example I

The runs included in Table I were carried out by the prior art process referred to on page 1 to show the effect of the incorporation of a catalyst according to the present invention.

One hundred forty (140) grams of salicylic acid, 149 grams of acetic anhydride, and 45 grams of acetic acid were placed in a round-bottomed flask equipped with an agitator, a thermometer, and a reflex condenser. The flask was immersed in a water bath which was controlled ±1° C. of the desired temperature and stirred for the indicated time. The batch was then cooled to room temperature and then in an ice bath to produce a crop of crystals. While at the depressed temperature the mixture was filtered and the filtrate evaporated to dryness to produce a residue. The crystals and residue were then examined for salicylic acid and aspirin. In ordinary operation the filtrate is not evaporated to dryness but accumulated in a vacuum still to produce additional crops of aspirin crystals and to recover the solvent for recycle. The following table gives the results of these runs:

TABLE I

| Run No. | Catalyst | Temperature, °C. | Time, hrs. | Percent Salicylic Acid | | Percent Theoretical Yield of Aspirin | | |
|---|---|---|---|---|---|---|---|---|
| | | | | Crystals | Residue | Crystals | Residue | Total |
| 1 | None | 65 | 2 | 10 | 2 | 70 | 25 | 95 |
| 2 | 27 p.p.m. Mg.(OH)$_2$ | 65 | 2 | <.1 | .2 | 89 | 9 | 98 |
| 3 | None | 85 | 2 | .4 | 4 | 66 | 31 | 97 |
| 4 | 27 p.p.m. Mg.(OH)$_2$ | 85 | 2 | <.1 | <.1 | 81 | 17 | 98 |

Example II

The runs included in Table II were carried out in the laboratory to show the increase in speed of reaction when a catalyst according to the present invention is employed:

One hundred forty (140) grams of salicylic acid, 149 grams of acetic anhydride, and 45 grams of acetic acid were placed in a round-bottomed flask equipped with an agitator, a thermometer and a reflux condenser. The flask was immersed in a water bath which was controlled ±1° C. of the desired temperature and stirred for the indicated time. The batch was then dumped into a cold dryer tray and left overnight in a forced circulation air dryer set at 25° C. The acetic acid and acetic anhydride were evaporated during this operation and the test for salicylic acid was carried out on the dry residue. It is to be noted that in runs No. 4, 8, and 12, a catalyst comprising 27 p.p.m. of magnesium hydroxide was introduced along with the initial reactants. Alternatively, the evaporation to dryness may be carried out by drawing a vacuum on the flask.

lute. The mixture is distilled to dryness at a vacuum of 20–50 mm. absolute. A quenching solution of water may be added to insure the prevention of the formation of sodium carbonate insolubles and the material again evaporated to dryness. The dryer was cooled and the finished crystals removed. The yield was 97.4% based on the theoretical yield. Liquids which were distilled off were recycled, or, in the case of excess acid, sold.

A study of the data indicates that the runs employing the catalyst show a marked increase in reaction rate and degree of completion at lower temperatures. In addition, the runs made without the catalyst produced cloudy solutions indicating the presence of undesirable by-products such as aspirin anhydride and others insoluble in sodium carbonate.

What is claimed is:

1. A method of preparing acetyl salicylic acid which comprises reacting salicylic acid with acetic anhydride in the presence of a metallic salt catalyst selected from the group consisting of magnesium hydroxide, nickel hydroxide, calcium nitrate, cobalt nitrate and magnesium acetate.

2. The method of claim 1 wherein said catalyst is magnesium hydroxide.

TABLE II

| Run No. | Salicyclic Acid, gm. | Acetic Anhydride, gm. | Acetic Acid, gm. | Catalyst | Temperature, °C. | Time, hrs. | Percent Salicylic Acid In Solids |
|---|---|---|---|---|---|---|---|
| 1 | 140 | 149 | 45 | None | 65 | 2 | 16.9 |
| 2 | 140 | 149 | 45 | do | 65 | 5 | 3.6 |
| 3 | 140 | 149 | 45 | do | 65 | 11 | 0.4 |
| 4 | 140 | 149 | 45 | 27 p.p.m. Mg.(OH)$_2$ | 65 | 2 | 0.1 |
| 5 | 140 | 149 | 45 | None | 75 | 2 | 1.4 |
| 6 | 140 | 149 | 45 | do | 75 | 5 | 0.2 |
| 7 | 140 | 149 | 45 | do | 75 | 11 | 0.1 |
| 8 | 140 | 149 | 45 | 27 p.p.m. Mg.(OH)$_2$ | 75 | 2 | 0.1 |
| 9 | 140 | 149 | 45 | None | 85 | 2 | 0.4 |
| 10 | 140 | 149 | 45 | do | 85 | 5 | 0.1 |
| 11 | 140 | 149 | 45 | do | 85 | 11 | 0.1 |
| 12 | 140 | 149 | 45 | 27 p.p.m. Mg.(OH)$_2$ | 85 | 2 | 0.1 |

Example III

A typical commercial run was carried out as follows:

Fourteen hundred (1400) pounds of salicylic acid were placed in a scale tank having a jacket temperature of about 85° C. and 950 pounds of acetic acid added. Twenty-two (22) grams of magnesium hydroxide catalyst were added and the mixture agitated. After incorporating 1225 pounds of acetic anhydride, the mixture was pulled into a glass-lined dryer having a jacket temperature of 75° C. by a vacuum of about 100 mm. abso- 3. The method of claim 1 wherein an inert organic diluent selected from the group consisting of acetic acid, benzene, toluene and xylene is mixed with the reactants.

References Cited

UNITED STATES PATENTS 2,248,112  6/1941  Neustein _____ 260—479

LORRAINE A. WEINBERGER, *Primary Examiner.*

P. J. KILLOS, *Assistant Examiner.*